Figure 1:
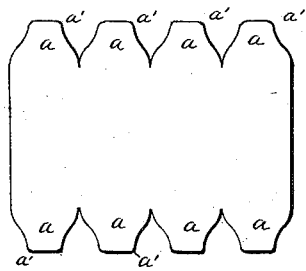

(No Model.)

J. A. SPITZER.
DEVICE FOR BLOCKING MUFFS.

No. 344,752. Patented June 29, 1886.

WITNESSES:
Geo. B. Collier
John H. Schreiner

INVENTOR
Jacob A. Spitzer
by Chas B. Collier
his Attorney

UNITED STATES PATENT OFFICE.

JACOB AXANDER SPITZER, OF PHILADELPHIA, PENNSYLVANIA.

DEVICE FOR BLOCKING MUFFS.

SPECIFICATION forming part of Letters Patent No. 344,752, dated June 29, 1886.

Application filed October 28, 1885. Serial No. 181,128. (No model.)

*To all whom it may concern:*

Be it known that I, JACOB AXANDER SPITZER, of the city and county of Philadelphia, in the State of Pennsylvania, have invented certain new and useful Improvements in Devices for Blocking Muffs and Articles of Like Character, of which improvements the following is a specification.

In the art of muff-making, as heretofore practiced, the skin intended to be made into a muff is cut to the required shape and dimensions, usually a parallelogram about eighteen inches in length and about nine inches in width. Its opposite ends are then sewed together to give to the skin a cylindrical form, after which it is subjected to the process of of blocking, which consists, after the skin shall have been moistened, in drawing the cylinder of fur over and upon a close-fitting solid cylinder of wood, the fur side of the skin being next to the wooden cylinder. The ends of the skin are then bent over and fastened to the ends of the wooden cylinder with tacks, after which the skin is worked by hand and stretched, the tacks from time to time during the operation being drawn out and reinserted in the skin until the proper shape and form and degree of stretching desired or attainable is effected. The skin is then allowed to dry upon the cylinder of wood, and when sufficiently dried the seam where its ends have at first been sewed together is cut to permit of its removal from the wooden cylinder. It is then resewed, stuffed, and lined, which completes the muff.

The process of blocking constitutes a trade in itself, and is one of the most difficult branches of muff-making, and muffs as heretofore made by the most skilled operatives will be found, upon examination, to be rough and creased at their ends where the skin has been bent, while the ends of the skin are permanently injured by the numerous holes in them caused by the tacks by which they have been fastened to the blocks. Naturally and unavoidably the muff by reason of such creases and perforations is not as symmetrical or as durable as it would be otherwise.

The object of my invention is so to construct a muff as to avoid and prevent the creasing of its ends; to secure for it, consequently, greater symmetry and permanence of form; to dispense with the use of tacks in the process of blocking, thus avoiding the injury to the skin consequent upon such use; to effect a uniform stretching of the skin, and to a greater degree than is attainable by the present method; to effect the construction of a muff of a novel kind, and one that will at the same time afford protection both to the hands and the wrists of the carrier of it, and to effect an economy in the making of the muff by dispensing with the skilled labor now required in the process of blocking.

To this end my invention consists in a novel device for blocking the skin.

Such device, hereinafter described, is specially adapted to and can be employed most advantageously in blocking muffs of a novel construction, of which I am the inventor, and for which a separate application for Letters Patent has been filed by me, of even date herewith, and serially numbered 181,127, and I shall accordingly describe in connection with said device the muffs so invented by me sufficiently to illustrate the manner of using my said device.

Figure 2:
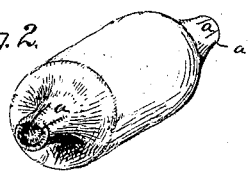
Figure 9:
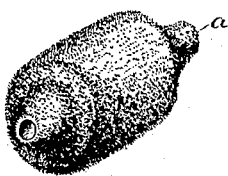
Figure 3:
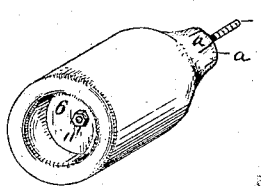
Figure 8:
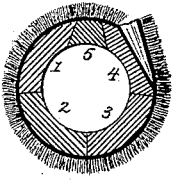
Figure 4:
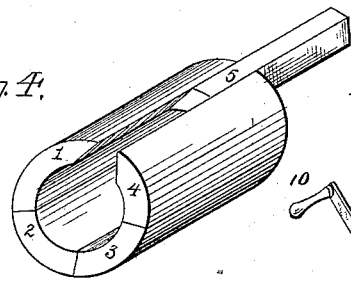
Figure 5:
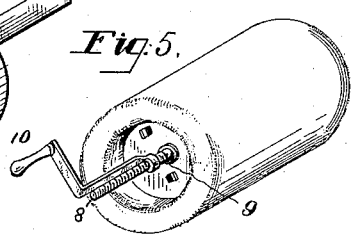
Figure 6:
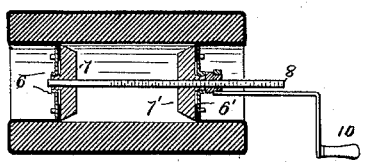
Figure 7:
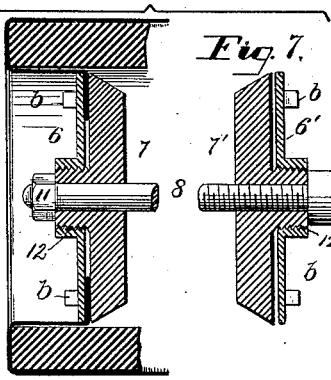

In the accompanying drawings, Figure 1 represents a skin shaped or cut preparatory to being made into a muff. Fig. 2 is a perspective view of an unfinished muff in readiness to be blocked. Fig. 3 is a perspective view of the unfinished muff with the clamping-plates and clamped end of the skin inserted in one end of the blocking-cylinder. Fig. 4 shows the blocking-cylinder in perspective with the key partially removed. Fig. 5 is a perspective view of the skin after the blocking devices have been inserted in it and pressure applied to the clamping-plates by the crank-lever. Fig. 6 is a central longitudinal sectional view of the skin, blocking-cylinder, clamping-plates, connecting-rod, and crank-lever after the skin or muff has been stretched upon the cylinder. Fig. 7 represents details of the clamping-plates and connecting-rod. Fig. 8 is a vertical section of a blocking device and skin surrounding same, one of the sides of which device and skin being flat or plane, and the skin or muff having a pocket on its flat side. Fig. 9 is the finished muff in perspective.

My improved blocking device is designed especially, as before stated, for blocking muffs of the special construction hereinbefore referred to, and illustrated in Figs. 1, 2, 3, and 9 of the drawings, and is composed of a series of sectional parts of wood or other suitable material, (marked 1, 2, 3, 4, and 5, respectively,) which, when placed inside of the skin and arranged as shown in Fig. 4, constitute a hollow blocking-cylinder proper, the piece 5 acting as a key to expand the other parts of the cylinder and hold them in position, two pairs of clamping-plates, 6 7 6' 7', having central openings for the passage through them of the rod or stem 8, and being threaded at 12, whereby the plates 6 and 6' can be screwed down upon the plates 7 and 7', respectively, rod or stem 8, which is threaded on one of its ends, threaded nut 9, and crank-lever 10.

After the skin has been cut or shaped, as shown in Fig. 1, and its parts sewed, forming it into the shape shown in Fig. 2, the parts 1, 2, 3, 4, and 5 of the blocking-cylinder are successively passed through one of the open ends of the reversed skin and arranged in the manner shown in Fig. 4, thus forming a hollow cylinder inside of the reversed skin, the diameter of the cylinder corresponding to that of the surrounding skin as nearly as may be. Next, the sewed ends $a\ a\ a\ a$ are inserted between the respective pairs of clamping-plates 6 7 6' 7' and the plates 6 6' are respectively screwed down upon plates 7 7' and upon the ends of the skin that have been so inserted, thus firmly clamping and holding the skin. The plates 6 and 6' have projections $b\ b$ upon their upper surfaces for the more convenient and effective turning and clamping of them upon the plates 7 7' and upon the skin between the respective pairs of plates. Then the clamping-plates and the clamped ends of the skin are inserted into the opposite ends of the hollow blocking-cylinder, as shown in Figs. 6 and 7. The rod 8, having a fixed nut or abutment, 11, on one of its ends, is passed through the central openings of the clamping-plates and longitudinally through the hollow blocking-cylinder, after which the threaded nut 9 is screwed down by crank-lever 10 on the threaded end of rod 8 and upon the clamping-plate 6', by which means the two pairs of clamping-plates and the clamped skin are drawn or forced toward each other and into the hollow blocking-cylinder, as shown in Fig. 6, to such extent as may be desired and as may be necessary to effect the proper degree of stretching of the skin. It will be found that, according to this method, the strain or tension exerted upon the skin is uniform, and can be exerted to a much greater degree than in the manner heretofore practiced, the result being that the completed muff will be free from creases and inequalities of surface, as compared with those made prior to my invention.

It is obvious that the diameter of the blocking-cylinder can be varied as desired, and that it is not material that it shall be composed of five parts only, since a greater or less number of parts can be employed without departing from the principle of my invention; but such parts should be made of such size, respectively, as to admit of convenient insertion into and withdrawal from the sewed ends $a\ a\ a\ a$ of the skin.

After the skin has dried sufficiently upon the blocking-cylinder the pressure is released from the clamping-plates, the rod, plates, and parts constituting the blocking device withdrawn from the skin, and the latter is then stuffed, lined, and finished in the ordinary manner.

Whereas in the manner heretofore practiced the blocking of six muffs per day is an average production of workmen of average skill, it is within bounds to state that the operation can be performed in a better manner with my device, and that five times the number stated above can be blocked in the time stated by any intelligent person after very brief practice.

Where it is desired to have a muff that is in part cylindrical and in part a flat or plane surface, so as to admit of the formation of a pocket in connection therewith—such as shown in section in Fig. 8—it is only necessary to make the outer surface of one of the sections of the blocking-cylinder flat or plane, as shown in said Fig. 8.

Should it be desired to construct a muff without having wristlets upon it, the sections to be cut from the skin between the parts $a\ a\ a\ a$ will be made of less depth than as shown, and the sections $a\ a\ a\ a$ can still be clamped, as described, and will in such case furnish a fur finish to the ends of the muff.

The plate 7 may, if desired, be permanently attached to the end 11 of rod 8, and the threaded nut 9 similarly attached to crank-lever 10.

I claim as my invention and desire to secure by Letters Patent—

The combination, with a hollow blocking-cylinder, of clamp-plates 6 7 6' 7', adapted to enter said cylinder, and devices, substantially as described, for moving said clamp-plates within said cylinder, substantially as set forth.

JACOB AXANDER SPITZER.

Witnesses:
WALTER S. GIBSON,
GEO. B. COLLIER.